G. B. WELSER, Jr.
CONVEYING APPARATUS.
APPLICATION FILED JAN. 4, 1919.
1,333,006.
Patented Mar. 9, 1920.
6 SHEETS—SHEET 1.
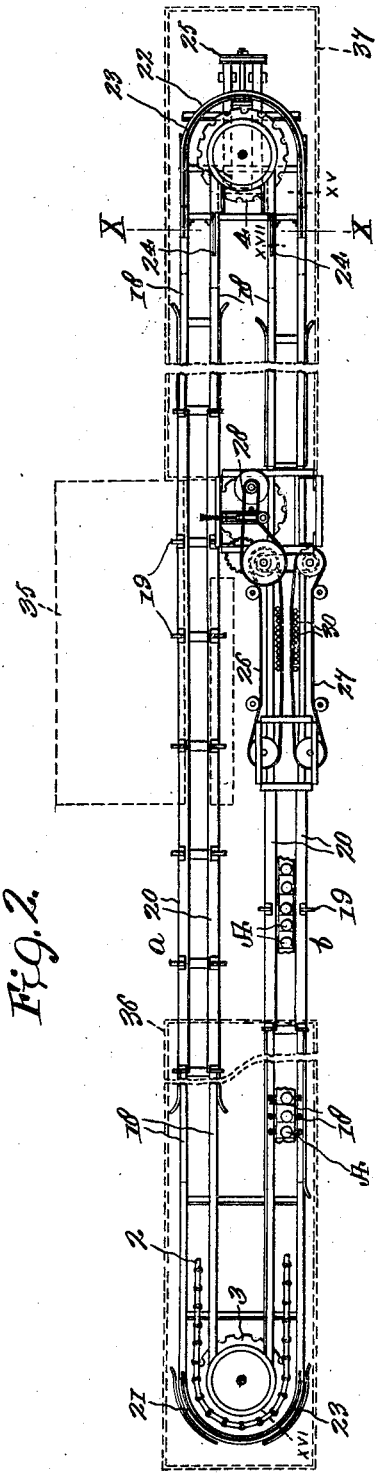
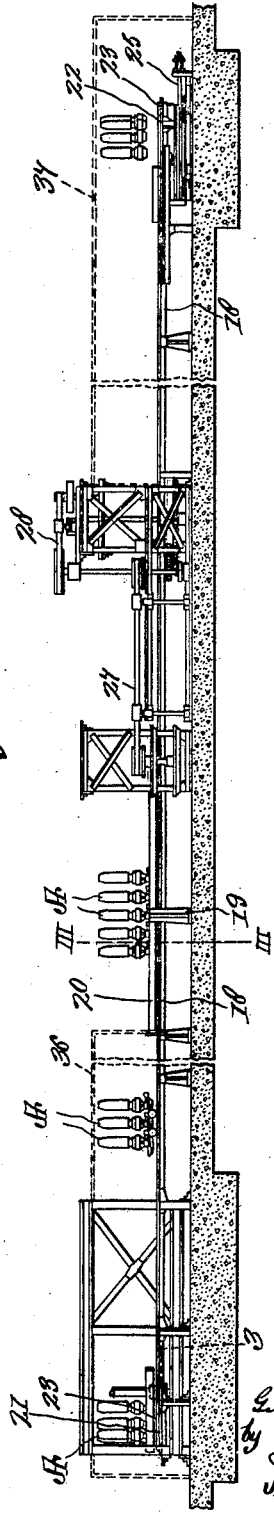

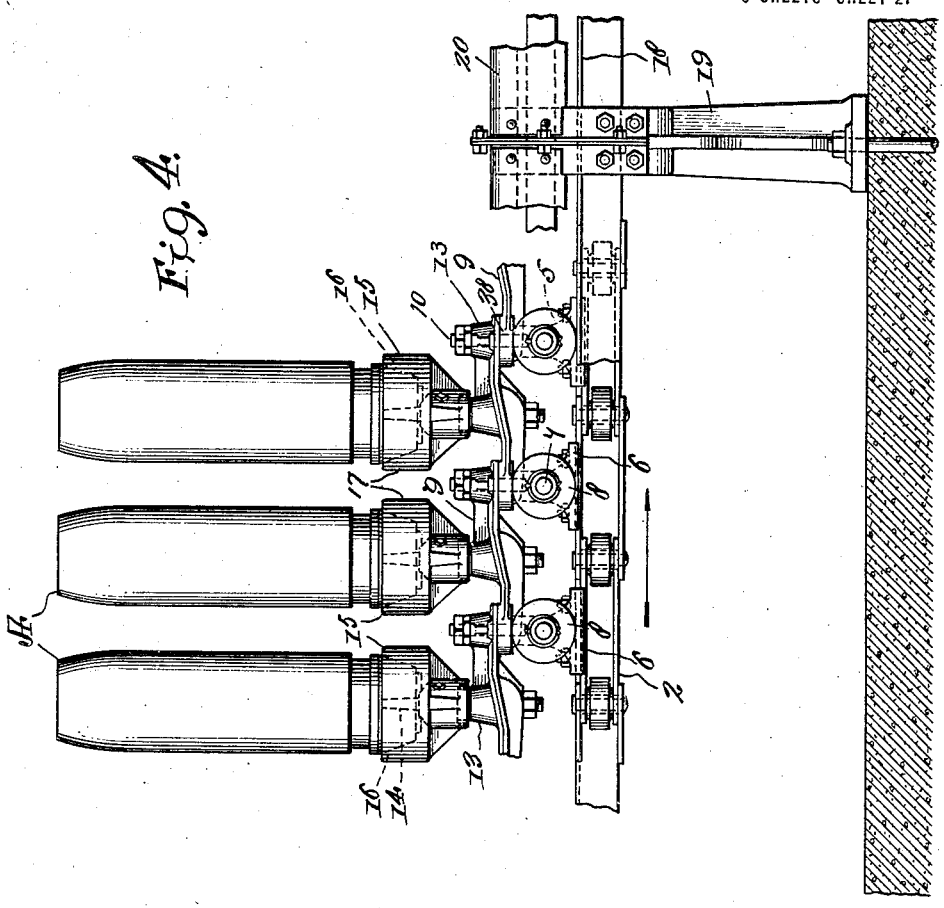
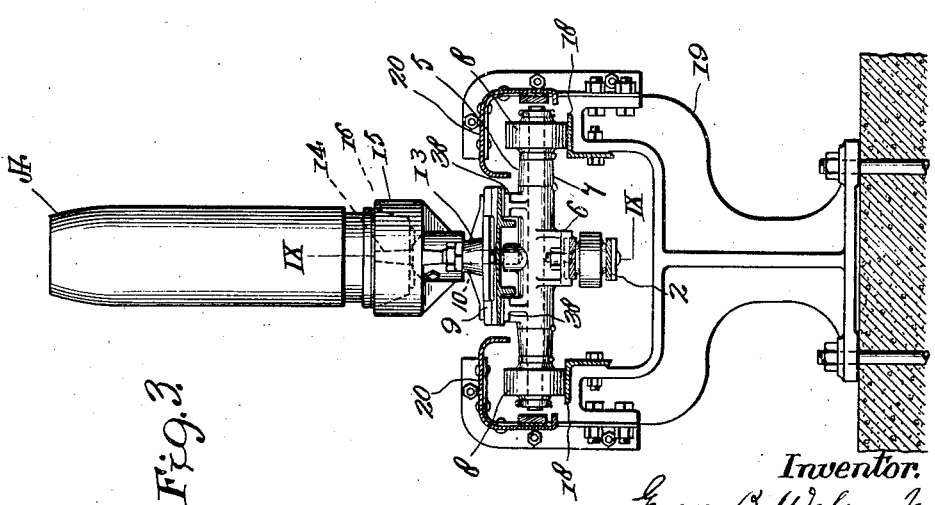

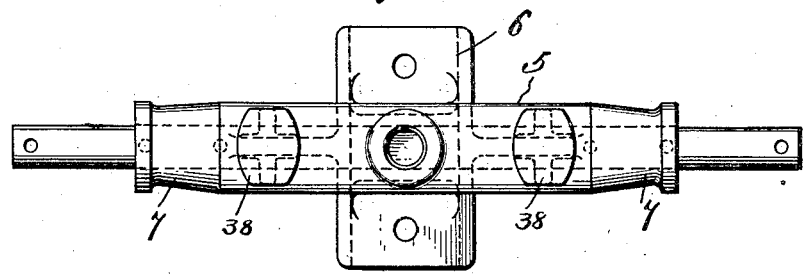
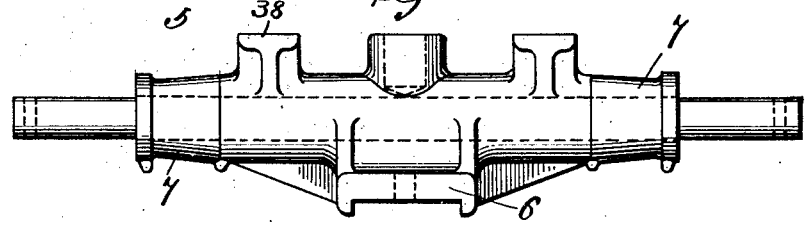
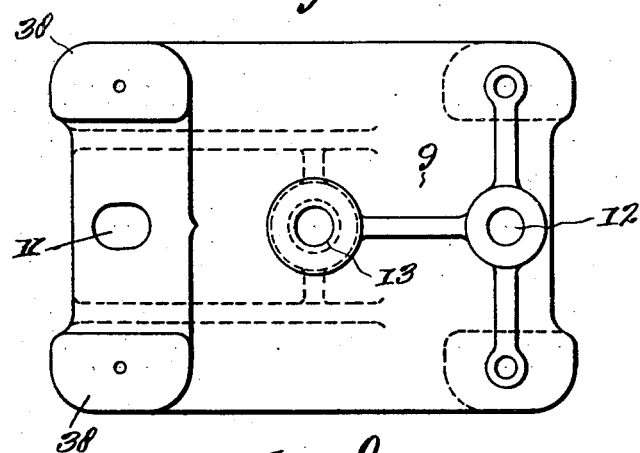
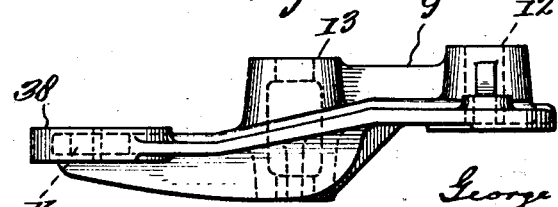

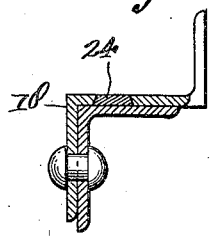
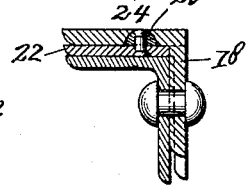
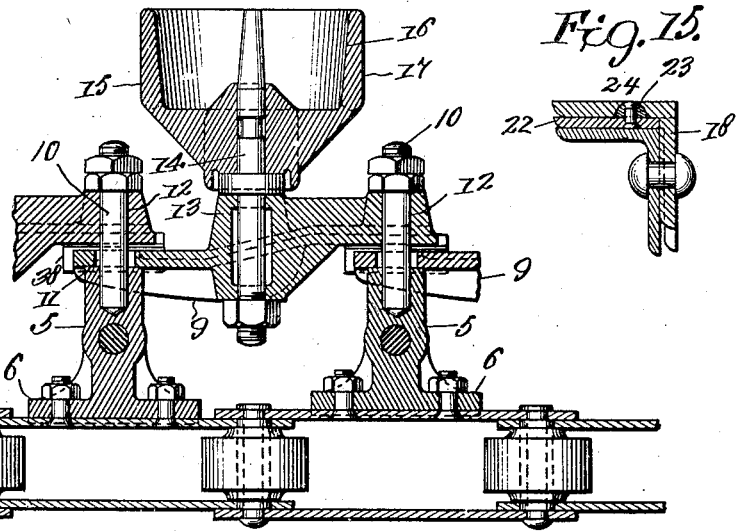
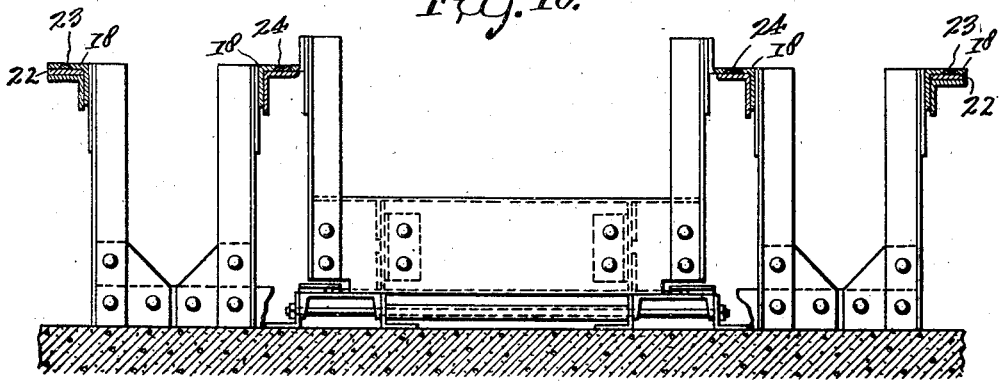
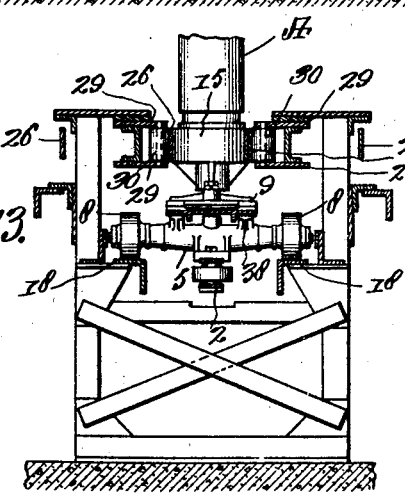
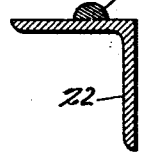

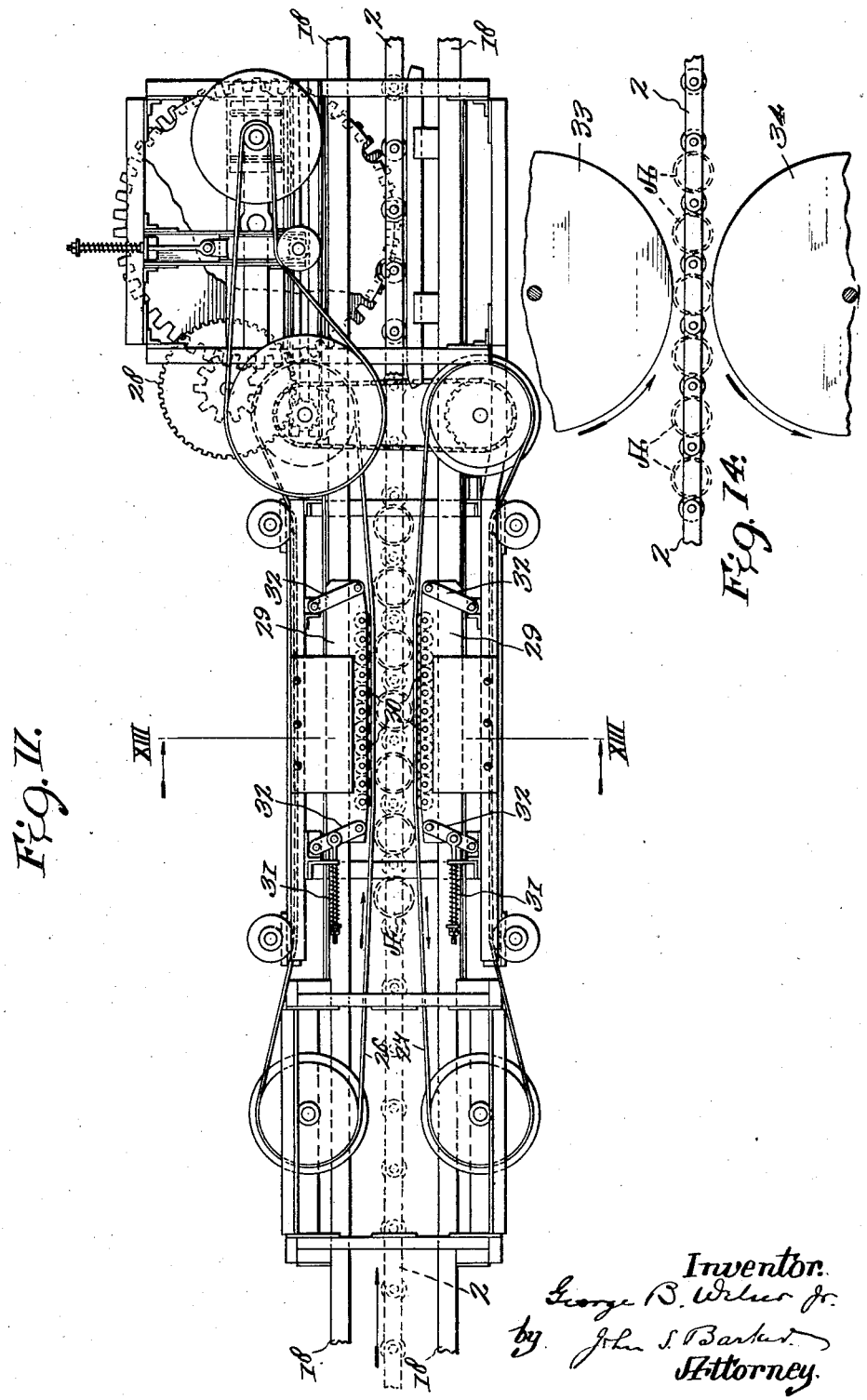

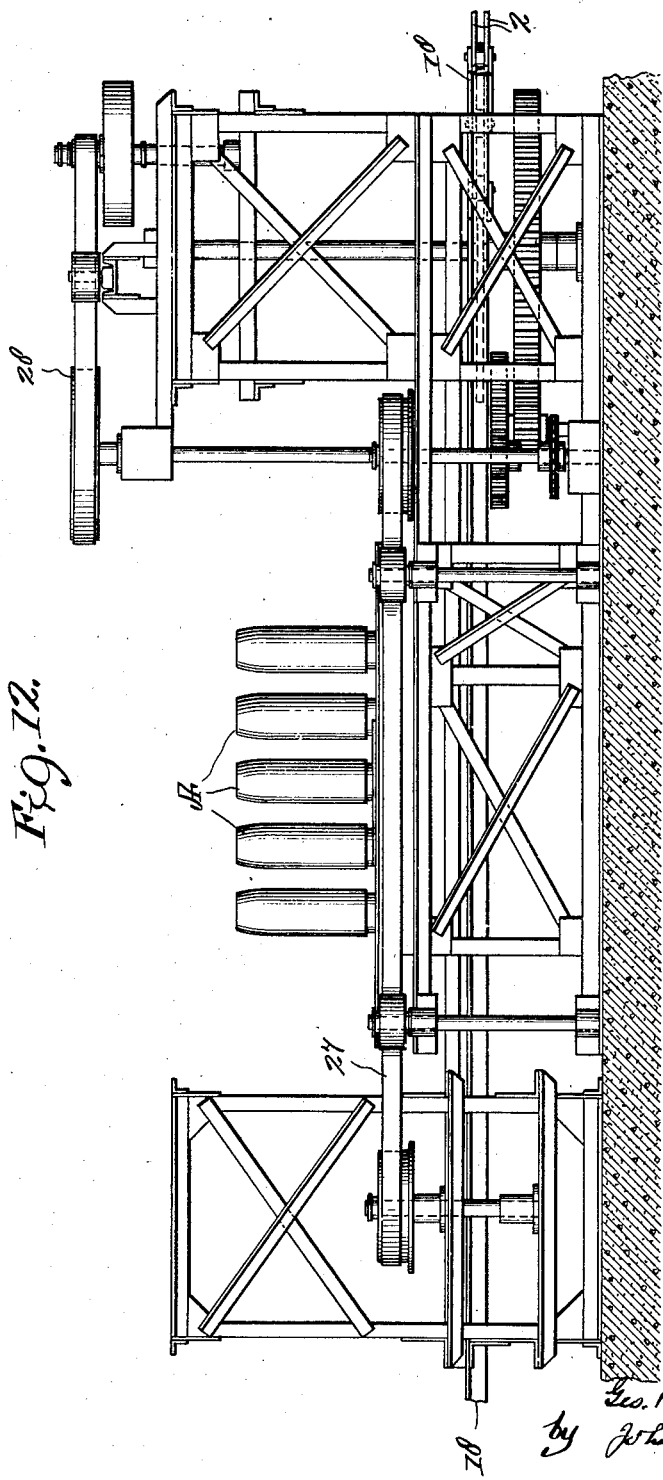

UNITED STATES PATENT OFFICE.

GEORGE B. WELSER, JR., OF MILWAUKEE, WISCONSIN, ASSIGNOR TO CHAIN BELT COMPANY, OF MILWAUKEE, WISCONSIN, A CORPORATION OF WISCONSIN.

CONVEYING APPARATUS.

1,333,006.　　　　　Specification of Letters Patent.　　Patented Mar. 9, 1920.

Application filed January 4, 1919. Serial No. 269,619.

*To all whom it may concern:*

Be it known that I, GEORGE B. WELSER, Jr., a citizen of the United States, residing at Milwaukee, in the county of Milwaukee and State of Wisconsin, have invented certain new and useful Improvements in Conveying Apparatus, of which the following is a specification.

My invention relates to conveying mechanism of the type in which the movements of the conveyer are in horizontal, or substantially horizontal planes. That embodiment of my invention herein illustrated has been devised with especial reference to the conveying and transporting of ordnance shells while they are being painted, dried, stenciled and striped and finally again dried. However, the invention in its useful applications is not limited to the particular embodiment thereof illustrated in the accompanying drawings, but is rather adapted to a wide variety of uses.

It has for its object to produce an improved conveying mechanism having novel features that will be herein pointed out and described and which are illustrated in the accompanying drawings, in which Figure 1 is a side elevation of a conveying mechanism embodying my improvements and adapted for conveying ordnance shells while being operated upon as above stated. Fig. 2 is a top plan view of the mechanism shown in Fig. 1. Fig. 3 is a transverse sectional view taken on the line III—III of Fig. 1, it being drawn on a much larger scale than Figs. 1 and 2. Fig. 4 is a side elevation, parts being broken away, of a short section of the conveyer, the parts being drawn to the same scale as Fig. 3. Fig. 5 is a plan view of one of the carrier trucks of the conveyer. Fig. 6 is an elevation of the truck. Fig. 7 is a top plan view of one of the supporting plates of the conveyer. Fig. 8 is a side elevation of the plate. Fig. 9 is a vertical sectional view taken on the line IX—IX of Fig. 3. Fig. 10 is a transverse sectional view on the line X—X of Fig. 2. Fig. 11 is a detail view of that part of the conveyer where the article carriers are rotated, and the associated mechanism for governing the rotation. Fig. 12 is a side view of the mechanism shown in Fig. 11. Fig. 13 is a transverse sectional view on the line XIII of Fig. 11. Fig. 14 is a plan view of a different form of mechanism for causing rotation of the article carriers. Fig. 15 is a detail cross sectional view on the line XV, Fig. 2. Fig. 16 is a detail cross sectional view on the line XVI Fig. 2. Fig. 17 is a detail cross sectional view on the line XVII Fig. 2.

The conveyer comprises an endless power chain 2 supported upon horizontally arranged sprocket wheels, one of which, 3, is driven, by any suitable mechanism, not illustrated, and the other of which, 4, is preferably adjustable in order that the desired tension upon the chain 2 may be maintained. I prefer that the chain should be provided with anti-friction rollers surrounding the vertically disposed pintles at the joints of the links, and that the side bars thereof should be formed of flat steel plates, as this form of chain, which is of well known construction, is well adapted to be used as the power chain of a conveyer such as herein presented.

To the chain are connected cross trucks 5, Figs. 5 and 6, there being a truck to each link in the construction illustrated. Each truck has at its center a flanged attaching plate 6 adapted to be bolted to the upper side bar of a link of a chain 2. The truck is provided with arms 7 extending laterally and disposed in a plane parallel to the plane in which the chain moves, in this instance extending horizontally, since the chain constitutes part of a horizontal conveyer. The ends of the arms 7 are formed to constitute supporting axles for the traction wheels 8, 8.

A series of supporting plates 9 Figs. 7 and 8, are carried by the trucks 5. These plates are preferably united to the trucks by vertical bolts, 10 seated in screw-threaded sockets provided therefor in the trucks and passing through apertures 11, 12 in the plates. The bolts are preferably arranged centrally over the chain 2; and on either side thereof, as indicated at 38, the plates have bearing upon the trucks 5, making them steady transversely. The ends of the plates may be overlapped as represented in Fig. 4 so that the apertures 11 and 12 register, a single bolt thus uniting the ends of two plates to one of the trucks. It is not essential to my invention that the plates be thus supported, but the arrangement shown is desirable. When thus arranged, one of the apertures, 11, is elongated or of slot-like formation to permit the necessary freedom of movement required between the plates and their attaching bolts when the conveyer turns about the wheels 3, 4. The supporting plate 9 is formed with a bearing 13, in which is mounted a vertical spindle 14 on which is supported, so as to be free to rotate, an article support or carrier 15. This carrier may be shaped to suit the articles it is to bear, being, in the form of apparatus illustrated, adapted to receive and support an ordnance shell A when standing upright. When constructed for supporting such articles the carrier is formed with a retaining seat 16 for the article. The carrier is formed with a cylindrical portion 17 that is preferably arranged as near as may be to the supporting plate 9.

18, 18 indicate the straight parallel rails upon which travel the traction wheels 8. These rails are supported in any suitable manner, as by the standards 19, and there are preferably guards 20 over the rails covering the wheels 8. The track sections about the wheels 3 and 4 are necessarily curved, that about the wheel 3 being designated 21 and that about the wheel 4, 22. As any one of the trucks 5 of the conveyer passes around one of the wheels, 3 or 4, the outer traction wheel thereof travels on the curved track, that is concentric with the wheel, while the inner traction wheel is unsupported, or rests upon the sprocket wheel, which may be shaped to constitute a support therefor inside its sprocket-carrying rim. Should the curved track section, with which the outer traction wheels of the trucks engage, have a flat face, like the faces of the straight tracks 18, there would be a certain amount of drag or slippage between the wheels and curved track, due to the difference in the distance traveled by the outside and the inside edges of the wheels. To overcome this, and the incident wear on the faces of the traction wheels, I provide the curved track sections 21 and 22 with bearing rails or bars 23, the upper faces of which, that is the faces engaged by the wheels 8, are curved. This provides practically a line track contact for the outer set of traction wheels 8, at each curved section 21, 22, and reduces the wear incident to the slippage above referred to.

As stated, the curved track section 22 is movable, in a direction parallel with the straight track sections with which it is connected, in order that the desired degree of tension may be maintained upon the conveyer, and to provide for moving this section there is suitable adjusting mechanism 25. There are suitable slide joints uniting the adjacent ends of the straight track sections 18 and the adjustable curved track section 22 as indicated at 24. and these joints may and preferably do include the end sections of the bearing rails 23, having curved upper faces, as indicated in Figs. 10 and 15.

The article support and carrier 15 is supported, as has already been stated, so as to be free to turn about the vertical spindle 14. I have provided mechanism for positively rotating these article supports during a portion of their course. In the embodiment of the invention illustrated, where the article supports are shown as carrying shells for ordnance, the revolving of the carriers 15 takes place at that part of the course of the conveyer where striping of the shells with paint is performed, the shells being revolved, about their vertical axes, along with the carriers on which they rest. But the revolving of the article supports and carriers may be advantageously used for other purposes, as for instance, to permit the articles carried being inspected or being treated otherwise than with paint.

Various means may be used for positively rotating the article supports during a part of thir course of travel, and I have illustrated two mechanisms for effecting these movements. I will first describe that which for some purposes I prefer.

26 indicates an endless traveling belt disposed so as to engage with the cylindrical portions 17 of the article supports and carriers 15 on one side of the longitudinal center of the conveyer, and 27 is a similar driven belt engaging with the cylindrical portions of the carriers on the opposite side of the conveyer. The belt 26 is driven so that the portion thereof engaging with the article carriers moves in the same direction as does the conveyer, while the other belt 27 is driven in the opposite direction, as indicated by the arrows in Fig. 11. In order to rotate the article holders at the proper speed, in an arrangement intended to be used for the circumferential striping of shells, the speed of the belt 26 should be about 70 feet per minute and that of the belt 27 about 59 feet per minute when the conveyer as a whole is traveling at a speed of 6 feet per minute. By such an arrangement the shells and their supports are rotated four or five times in approximately 7 feet of travel. A driving mechanism for the belts is indicated at 28, it taking its power from the chain 2 engaging with a sprocket wheel that is a part of such driving mechanism. The portions of the belts 26 and 27 that are in engagement with the article carriers 15 are held in working position by frames 29. These frames are supported by parallel links 32 and preferably carry rollers 30 that constitute antifriction backings for the belts.

Springs 31 act upon the links 32 and, through the frames 29, hold the belts with yielding force against the article carriers.

In Fig. 14 I have illustrated an alternative form of mechanism for rotating the article carriers where driven wheels 33, 34 engage with the cylindrical parts 17 of the article supports and carriers and cause their rotation. These wheels have to be large and can act upon the article carriers for only a relatively short space of time, so that the number of revolutions that can be imparted by an arrangement of this kind is limited. However, for some classes of work, this arrangement has practical advantages.

The apparatus illustrated in Figs. 1 and 2 is operated as follows: The shells to be painted are placed upon the carriers of the conveyer so as to stand upright from the loading platform 35. At about the position a, the shells are coated with paint preferably by paint-spraying mechanism, after which they pass into a drying oven 36 that incloses a part of the conveyer. They emerge from the oven preferably on that run of the conveyer that is opposite to the one where the shells are loaded. The paint applied at the position a is then dried. The shells may then be stenciled, if that be desired, at the position b, before they pass to the mechanism that causes the shell carriers to be revolved and where they are striped. Upon passing beyond the mechanism for revolving the carriers the conveyer passes into a second drying oven 37. This oven is of such dimensions that the shells, upon emerging therefrom are opposite that part of the platform 35 which is utilized for unloading purposes, where they are taken off the conveyer and are replaced by other shells to be treated in the manner indicated.

As stated, the conveyer may be utilized for a wide variety of purposes.

It will be seen that the conveyer consists of the articulated power transmission chain, the articulated set of supporting plates and the trucks 5, the three elements referred to, to wit, the chain, the trucks and the supporting plates, being united to each other. This arrangement gives to the set of connected and articulating plates that support that is necessary for them to have when carrying heavy loads and especially when such loads have considerable vertical height, the supporting plates being laterally supported by the trucks and longitudinally supported by their connection with each other and with the trucks.

The supports 15 which hold the articles in vertical position are as represented in Fig. 3, located directly above the chain 2, which travels in a horizontal plane; and the trucks that carry the vertical supports or holders have arms extending laterally beyond the chains and engaging with tracks 18 separated as widely as may be required to give the necessary stability to the conveyer.

I have illustrated a transmission chain of well known construction as the element through which power is transmitted to operate the conveyer, and such I propose to use in apparatus of the kind illustrated. It will be understood, however, that this chain is but typical of a flexible power transmitting means of any suitable character, such as a cable of hemp or steel, or of metal links of the ship's cable type; and I therefore wish it to be understood that when herein I employ the term "chain" as applied to the power transmission element, that term is used in a generic sense to include not only a chain of the specific form illustrated, but its mechanical equivalents, such as above suggested, the single term being used to avoid the multiplicity of words in describing and claiming the invention.

What I claim is:

1. A conveyer adapted to travel in a substantially horizontal plane, comprising a power transmission chain, a set of articulated supporting plates for the articles to be carried, trucks arranged between the chain and supporting plates and connected with each of these, and rotatable carriers for the articles supported by the plates.

2. A conveyer adapted to travel in a substantially horizontal plane, comprising a power transmission chain, trucks secured rigidly to the side bars of the chain and extending transversely across it, a set of supporting plates, the ends of which rest upon the trucks, and connecting bolts passing through the plates and pivotally uniting them together and with the trucks.

3. A conveyer adapted to travel in a substantially horizontal plane, comprising a power transmission chain, trucks secured to the side bars of the chain and extending transversely across it, supporting plates, the ends of which are pivotally connected with the trucks so that they may articulate, upwardly extending spindles securely supported in the plates between their articulating ends, and article supports and carriers mounted on the spindles so as to be free to rotate thereon.

4. In an endless conveyer, the combination of a power transmission chain, supporting wheels about which the chain turns, transversely extending trucks secured to the chain and provided with transverse arms disposed in a plane parallel with that in which the chain moves, the arms carrying supporting traction wheels, and tracks on which the said wheels travel, the portions of track about the wheels with which the power transmission chain engages being concentric therewith and formed with curved faces on which the traction wheels run, whereby there is established approximately a line contact for the wheels at the said curved portions of the track.

5. In a conveying apparatus the combination of a single articulated sprocket chain supported and driven with its joints vertically disposed so that the chain travels in a horizontal plane, trucks supported by upper side bars of the chain links having horizontal arms extending laterally beyond the chain, tracks for supporting the said arms, and supports for holding articles in an upright position, carried by the trucks and located vertically above the chain.

6. In a conveying apparatus the combination of a single articulated sprocket chain supported and driven with its joints vertically disposed so that it travels in a horizontal plane, trucks supported by upper side bars of the chain links having horizontal arms extending laterally beyond the chain, tracks for supporting the said arms, rotatable supports for holding articles in an upright position, carried by the trucks and located vertically above the chain, and means for rotating the article supports while being moved by the chain.

7. In an endless conveyer the combination of a series of rotatable article carriers secured to and moved by the conveyer, an endless traveling belt adapted to engage with the article carriers on one side of the central line of movement of the conveyer, an endless traveling belt adapted to engage with the article carriers on the opposite side of the said line of the conveyer, means for holding the belts against the article carriers with yielding force, and means for driving the belts in opposite directions and at different speeds.

8. In an endless conveyer the combination with a series of rotatable article carriers moved by the conveyer, a belt for engaging with the article carriers on one side of the central line of travel of the conveyer, a belt for engaging with the article carriers on the opposite side of the said line, means for driving these belts so that their working faces travel in opposite directions, sets of rollers back of the said belts for holding them in engagement with the article carriers, movable frames for carrying the said backing rollers and spring-actuated means for holding the frames toward the article carriers with yielding force.

9. In an endless conveyer the combination of a main power chain, wheels upon which the chain is supported and by which it is driven, a set of rotatable article carriers connected with and moved by the said power chain, endless belts engaging with the article carriers upon their opposite sides for rotating them as they are moved by the conveyer and driving mechanism for moving the said belts so their working faces travel in opposite directions, the said driving mechanism taking power from the power chain and being arranged to drive one of the belts faster than the other.

GEO. B. WELSER, Jr.